(12) United States Patent
Usher et al.

(10) Patent No.: US 9,706,280 B2
(45) Date of Patent: Jul. 11, 2017

(54) METHOD AND DEVICE FOR VOICE OPERATED CONTROL

(71) Applicant: Personics Holdings, LLC, Boca Raton, FL (US)

(72) Inventors: John Usher, Beer (GB); Steve Goldstein, Delray Beach, FL (US); Marc Boillot, Plantation, FL (US)

(73) Assignee: Personics Holdings, LLC, Boca Raton, FL (US)

( * ) Notice: Subject to any disclaimer, the term of this patent is extended or adjusted under 35 U.S.C. 154(b) by 0 days.

(21) Appl. No.: 14/800,556

(22) Filed: Jul. 15, 2015

(65) Prior Publication Data

US 2015/0334484 A1 Nov. 19, 2015

Related U.S. Application Data

(63) Continuation of application No. 14/087,056, filed on Nov. 22, 2013, which is a continuation of application
(Continued)

(51) Int. Cl.
*H03G 3/20* (2006.01)
*H04R 1/08* (2006.01)
(Continued)

(52) U.S. Cl.
CPC ............ *H04R 1/08* (2013.01); *G10L 15/20* (2013.01); *G10L 19/00* (2013.01); *G10L 25/78* (2013.01);
(Continued)

(58) Field of Classification Search
CPC ...... H04R 3/00; H04R 3/002; H04R 2410/05; H04R 2430/03; H04R 1/091; H04R 25/02;
(Continued)

(56) References Cited

U.S. PATENT DOCUMENTS 5,852,804 A * 12/1998 Sako ................... B60R 16/0373
704/243
6,618,073 B1 9/2003 Lambert et al.
(Continued)

FOREIGN PATENT DOCUMENTS

WO 2012/078670 A1 6/2012

*Primary Examiner* — Lun-See Lao
(74) *Attorney, Agent, or Firm* — Pablo Meles

(57) ABSTRACT

At least one exemplary embodiment is directed to an acoustic device including an ear canal microphone configured to detect a first acoustic signal, an ambient microphone configured to detect a second acoustic signal, and a processor operatively coupled to the ear canal microphone and the ambient microphone. The processor is configured to detect a predetermined speech pattern based on an analysis of the first acoustic signal and the second acoustic signal and upon detection of the predetermined speech pattern, subsequently process acoustic signals from the ear canal microphone for a predetermined time or until the ear canal microphone detects a lack of an acoustic signal for a second predetermined time. After the predetermined time or after a second predetermined time, the processor processes acoustic signals from the ear canal microphone and the ambient microphone.

16 Claims, 8 Drawing Sheets

Related U.S. Application Data

No. 12/102,555, filed on Apr. 14, 2008, now Pat. No. 8,611,560.

(60) Provisional application No. 60/911,691, filed on Apr. 13, 2007.

(51) Int. Cl.
*G10L 25/78* (2013.01)
*H04R 25/00* (2006.01)
*G10L 19/00* (2013.01)
*H04R 1/10* (2006.01)
*H04R 3/00* (2006.01)
*G10L 15/20* (2006.01)

(52) U.S. Cl.
CPC ........... *H04R 1/1041* (2013.01); *H04R 3/005* (2013.01); *H04R 25/50* (2013.01)

(58) Field of Classification Search
CPC .. H04R 25/505; H04R 29/008; H04R 29/004; H04R 1/08; H04R 2460/01; H04R 25/453; H04R 25/50
USPC ......... 381/110, 92, 107, 59, 74, 57, 56, 309; 700/94; 704/206, 233, 231, 226, 228, 704/214; 379/419, 428.01, 430, 433.01, 379/433.02
See application file for complete search history.

(56) References Cited

U.S. PATENT DOCUMENTS

| | | | |
|---|---|---|---|
| 8,098,844 B2 * | 1/2012 | Elko | H04R 3/005 |
| | | | 381/122 |
| 8,391,501 B2 | 3/2013 | Khawand et al. | |
| 8,401,206 B2 | 3/2013 | Seltzer et al. | |
| 8,467,543 B2 | 6/2013 | Burnett et al. | |
| 8,503,704 B2 | 8/2013 | Francart et al. | |
| 8,583,428 B2 | 11/2013 | Tashev et al. | |
| 8,600,454 B2 | 12/2013 | Nicholson | |
| 8,606,571 B1 | 12/2013 | Every et al. | |
| 8,611,560 B2 * | 12/2013 | Goldstein | H04R 25/50 |
| | | | 381/110 |
| 2003/0035551 A1 | 2/2003 | Light et al. | |
| 2005/0058313 A1 * | 3/2005 | Victorian | H04R 25/554 |
| | | | 381/315 |
| 2005/0175189 A1 | 8/2005 | Lee et al. | |
| 2006/0074693 A1 | 4/2006 | Yamashita | |
| 2006/0133621 A1 | 6/2006 | Chen et al. | |
| 2007/0033029 A1 | 2/2007 | Sakawaki | |
| 2007/0053522 A1 | 3/2007 | Murray et al. | |
| 2007/0076896 A1 | 4/2007 | Honsaka et al. | |
| 2007/0076898 A1 | 4/2007 | Sarroukh et al. | |
| 2007/0086600 A1 | 4/2007 | Boesen | |
| 2007/0088544 A1 | 4/2007 | Acero et al. | |
| 2007/0230712 A1 | 10/2007 | Belt et al. | |
| 2007/0237341 A1 | 10/2007 | Laroche | |
| 2008/0147397 A1 | 6/2008 | Konig et al. | |
| 2009/0209290 A1 | 8/2009 | Chen et al. | |

* cited by examiner

400

600

800

METHOD AND DEVICE FOR VOICE OPERATED CONTROL

CROSS REFERENCE TO RELATED APPLICATIONS

This Application is a continuation application that claims the priority benefit of pending patent application Ser. No. 14/087,056 filed on Nov. 22, 2013 which is a Continuation application of U.S. application Ser. No. 12/102,555 filed on Apr. 14, 2008 (now U.S. Pat. No. 8,611,560); U.S. application Ser. No. 12/102,555 claims the priority benefit of Provisional Application No. 60/911,691 filed on Apr. 13, 2007; the entire contents of all aforementioned Applications are incorporated herein by reference in their entirety.

FIELD

The present invention pertains to sound processing using earpieces, and more particularly, to a device and method for controlling operation of an earpiece based on voice activity.

BACKGROUND

It can be difficult to communicate using an earpiece or earphone device in the presence of high-level background sounds. The earpiece microphone can pick up environmental sounds such as traffic, construction, and nearby conversations that can degrade the quality of the communication experience. In the presence of babble noise, where numerous talkers are simultaneously speaking, the earpiece does not adequately discriminate between voices in the background and the voice of the user operating the earpiece.

Although audio processing technologies can adequately suppress noise, the earpiece is generally sound agnostic and cannot differentiate sounds. Thus, a user desiring to speak into the earpiece may be competing with other people's voices in his or her proximity that are also captured by the microphone of the earpiece.

A need therefore exists for a method and device of personalized voice operated control.

SUMMARY

Embodiments in accordance with the present provide a method and device for voice operated control. Other embodiments are disclosed.

In a first embodiment, an acoustic device is provided that includes a first microphone configured to detect a first acoustic signal, a second microphone configured to detect a second acoustic signal, and a processor operatively coupled to the first microphone and the second microphone. The processor can detect a spoken voice based on an analysis of the first acoustic signal captured by the first microphone and the second acoustic signal captured by the second microphone. A voice operated control is configured to mix the first acoustic signal and the second acoustic signal to produce a mixed signal. The voice operated control can be configured to increase a first gain of one of the first acoustic signal and the second acoustic signal, where the mixed signal includes a combination of the first acoustic signal and the second acoustic signal. The analysis can be at least one among a sound pressure level comparison, a correlation, a coherence, a spectral difference or a ratio between the first acoustic signal and the second acoustic signal.

In a second embodiment, a method for voice operated control of at least one acoustic device is provided. The method can include the steps of detecting and measuring a first acoustic signal at a first microphone, detecting and measuring a second acoustic signal at a second microphone, cross correlating on at least one of the first acoustic signal or the second acoustic signal, and controlling at least one voice operation of the acoustic device if the spoken voice is detected. The voice operated control can be configured to control the production of the mixed signal based on one or more aspects of the spoken voice. As an example, the spoken voice can be detected if a peak of the cross correlation is within a predetermined amplitude range and a timing of the peak is within a predetermined time range. The spoken voice may be detected if the peak and the timing of the cross correlation reveals that the spoken voice arrives at the first microphone before the second microphone. The cross correlation can be performed between a first ambient sound within a first earpiece and the spoken voice captured at the first earpiece.

In a third embodiment, a method for voice and audio control of at least one acoustic device is provided. It can include the steps of measuring a first sound received from a first microphone, measuring a second sound received from a second microphone, detecting a spoken voice based on an analysis of measurements taken at the first and second microphone, mixing the first sound and the second sound to produce a mixed signal; and controlling the production of the mixed signal based on one or more aspects of the spoken voice. The analysis can be at least one among a sound pressure level comparison, a correlation, a coherence, or a spectral difference. The method can further control at least one voice operation if the spoken voice is detected. In one arrangement, the controlling of the production of the mixed signal can be done by increasing a gain of a remaining one of the first sound and the second sound such that the mixed signal includes a combination of the first sound and the second sound. Also, the step of detecting the spoken voice can be performed if a sound pressure level of the first sound or the second sound is above a predetermined threshold. A level comparison analysis can be performed of the first sound measured by a first earpiece microphone and a second sound measured by a second earpiece microphone.

DETAILED DESCRIPTION

Figure 1:
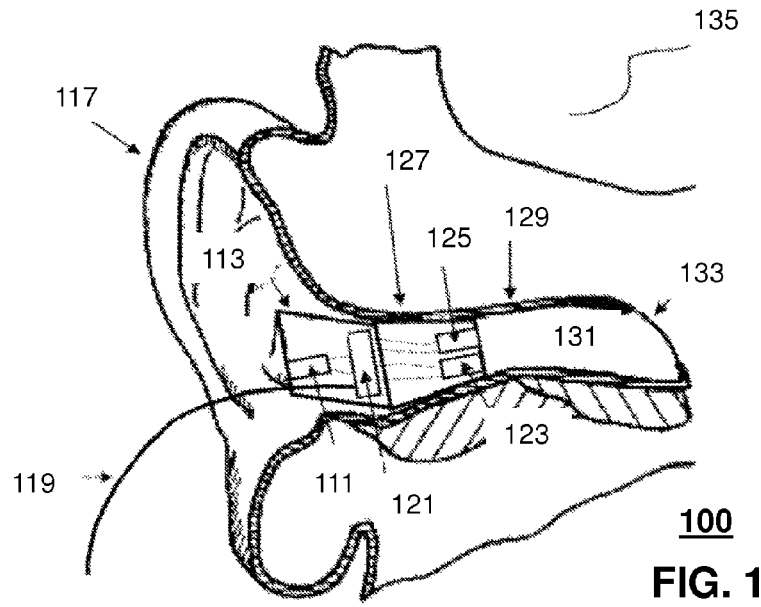
FIG. 1 is a pictorial diagram of an earpiece in accordance with an exemplary embodiment.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication and use of transducers.

In all of the examples illustrated and discussed herein, any specific values, for example the sound pressure level change, should be interpreted to be illustrative only and non-limiting. Thus, other examples of the exemplary embodiments could have different values.

Note that similar reference numerals and letters refer to similar items in the following figures, and thus once an item is defined in one figure, it may not be discussed for following figures.

Note that herein when referring to correcting or preventing an error or damage (e.g., hearing damage), a reduction of the damage or error and/or a correction of the damage or error are intended.

At least one exemplary embodiment of the invention is directed to an earpiece for voice operated control. Reference is made to FIG. 1 in which an earpiece device, generally indicated as earpiece 100, is constructed and operates in accordance with at least one exemplary embodiment of the invention. As illustrated, earpiece 100 depicts an electroacoustical assembly 113 for an in-the-ear acoustic assembly, as it would typically be placed in the ear canal 131 of a user 135. The earpiece 100 can be an in the ear earpiece, behind the ear earpiece, receiver in the ear, open-fit device, or any other suitable earpiece type. The earpiece 100 can be partially or fully occluded in the ear canal, and is suitable for use with users having healthy or abnormal auditory functioning.

Earpiece 100 includes an Ambient Sound Microphone (ASM) 111 to capture ambient sound, an Ear Canal Receiver (ECR) 125 to deliver audio to an ear canal 131, and an Ear Canal Microphone (ECM) 123 to assess a sound exposure level within the ear canal. The earpiece 100 can partially or fully occlude the ear canal 131 to provide various degrees of acoustic isolation. The assembly is designed to be inserted into the user's ear canal 131, and to form an acoustic seal with the walls of the ear canal at a location 127 between the entrance to the ear canal and the tympanic membrane (or ear drum) 133. Such a seal is typically achieved by means of a soft and compliant housing of assembly 113. Such a seal can create a closed cavity 131 of approximately 5 cc between the in-ear assembly 113 and the tympanic membrane 133. As a result of this seal, the ECR (speaker) 125 is able to generate a full range bass response when reproducing sounds for the user. This seal also serves to significantly reduce the sound pressure level at the user's eardrum resulting from the sound field at the entrance to the ear canal 131. This seal is also a basis for a sound isolating performance of the electroacoustic assembly.

Located adjacent to the ECR 125, is the ECM 123, which is acoustically coupled to the (closed or partially closed) ear canal cavity 131. One of its functions is that of measuring the sound pressure level in the ear canal cavity 131 as a part of testing the hearing acuity of the user as well as confirming the integrity of the acoustic seal and the working condition of the earpiece 100. In one arrangement, the ASM 111 is housed in the ear seal 113 to monitor sound pressure at the entrance to the occluded or partially occluded ear canal. All transducers shown can receive or transmit audio signals to a processor 121 that undertakes audio signal processing and provides a transceiver for audio via the wired or wireless communication path 119.

The earpiece 100 can actively monitor a sound pressure level both inside and outside an ear canal and enhance spatial and timbral sound quality while maintaining supervision to ensure safes sound reproduction levels. The earpiece 100 in various embodiments can conduct listening tests, filter sounds in the environment, monitor warning sounds in the environment, present notification based on identified warning sounds, maintain constant audio content to ambient sound levels, and filter sound in accordance with a Personalized Hearing Level (PHL).

The earpiece 100 can generate an Ear Canal Transfer Function (ECTF) to model the ear canal 131 using ECR 125 and ECM 123, as well as an Outer Ear Canal Transfer function (OETF) using ASM 111. For instance, the ECR 125 can deliver an impulse within the ear canal and generate the ECTF via cross correlation of the impulse with the impulse response of the ear canal. The earpiece 100 can also determine a sealing profile with the user's ear to compensate for any leakage. It also includes a Sound Pressure Level Dosimeter to estimate sound exposure and recovery times. This permits the earpiece 100 to safely administer and monitor sound exposure to the ear.

Figure 2:
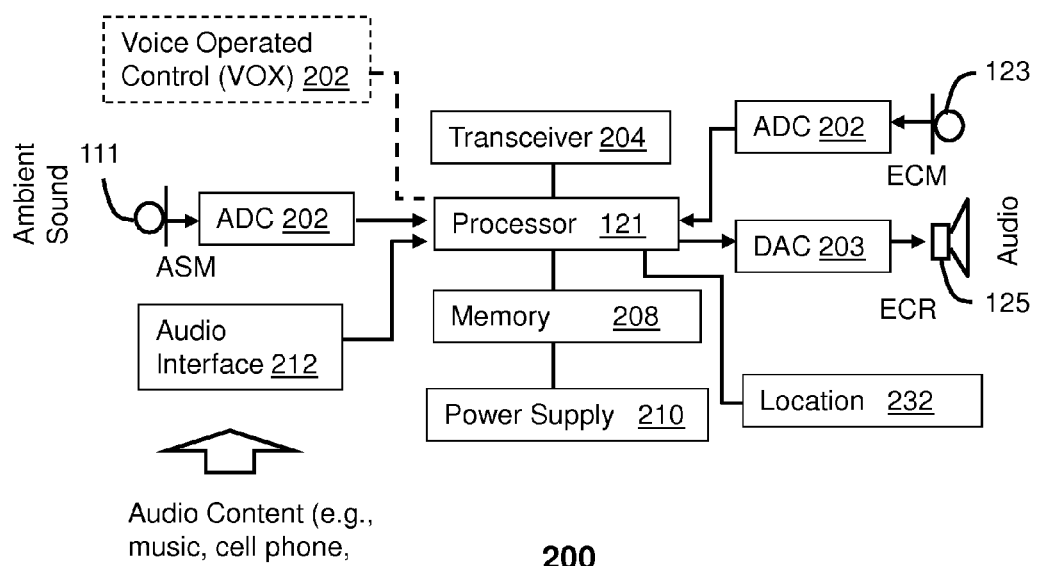
FIG. 2 is a block diagram of the earpiece in accordance with an exemplary embodiment.

Referring to FIG. 2, a block diagram 200 of the earpiece 100 in accordance with an exemplary embodiment is shown. As illustrated, the earpiece 100 can include the processor 121 operatively coupled to the ASM 111, ECR 125, and ECM 123 via one or more Analog to Digital Converters (ADC) 202 and Digital to Analog Converters (DAC) 203. The processor 121 can utilize computing technologies such as a microprocessor, Application Specific Integrated Chip (ASIC), and/or digital signal processor (DSP) with associated storage memory 208 such a Flash, ROM, RAM, SRAM, DRAM or other like technologies for controlling operations of the earpiece device 100. The processor 121 can also include a clock to record a time stamp.

As illustrated, the earpiece 100 can include a voice operated control (VOX) module 202 to provide voice control to one or more subsystems, such as a voice recognition system, a voice dictation system, a voice recorder, or any other voice related processor. The VOX 202 can also serve as a switch to indicate to the subsystem a presence of spoken voice and a voice activity level of the spoken voice. The VOX 202 can be a hardware component implemented by discrete or analog electronic components or a software component. In one arrangement, the processor 121 can provide functionality of the VOX 202 by way of software, such as program code, assembly language, or machine language.

The memory 208 can also store program instructions for execution on the processor 206 as well as captured audio processing data. For instance, memory 208 can be off-chip and external to the processor 208, and include a data buffer to temporarily capture the ambient sound and the internal sound, and a storage memory to save from the data buffer the recent portion of the history in a compressed format responsive to a directive by the processor. The data buffer can be a circular buffer that temporarily stores audio sound at a current time point to a previous time point. It should also be noted that the data buffer can in one configuration reside on the processor 121 to provide high speed data access. The storage memory can be non-volatile memory such as SRAM to store captured or compressed audio data.

The earpiece 100 can include an audio interface 212 operatively coupled to the processor 121 and VOX 202 to receive audio content, for example from a media player, cell phone, or any other communication device, and deliver the audio content to the processor 121. The processor 121 responsive to detecting voice operated events from the VOX 202 can adjust the audio content delivered to the ear canal. For instance, the processor 121 (or VOX 202) can lower a volume of the audio content responsive to detecting an event for transmitting the acute sound to the ear canal. The processor 121 by way of the ECM 123 can also actively monitor the sound exposure level inside the ear canal and adjust the audio to within a safe and subjectively optimized listening level range based on voice operating decisions made by the VOX 202.

The earpiece 100 can further include a transceiver 204 that can support singly or in combination any number of wireless access technologies including without limitation Bluetooth™, Wireless Fidelity (WiFi), Worldwide Interoperability for Microwave Access (WiMAX), and/or other short or long range communication protocols. The transceiver 204 can also provide support for dynamic downloading over-the-air to the earpiece 100. It should be noted also that next generation access technologies can also be applied to the present disclosure.

The location receiver 232 can utilize common technology such as a common GPS (Global Positioning System) receiver that can intercept satellite signals and therefrom determine a location fix of the earpiece 100.

The power supply 210 can utilize common power management technologies such as replaceable batteries, supply regulation technologies, and charging system technologies for supplying energy to the components of the earpiece 100 and to facilitate portable applications. A motor (not shown) can be a single supply motor driver coupled to the power supply 210 to improve sensory input via haptic vibration. As an example, the processor 121 can direct the motor to vibrate responsive to an action, such as a detection of a warning sound or an incoming voice call.

The earpiece 100 can further represent a single operational device or a family of devices configured in a master-slave arrangement, for example, a mobile device and an earpiece. In the latter embodiment, the components of the earpiece 100 can be reused in different form factors for the master and slave devices.

Figure 3:
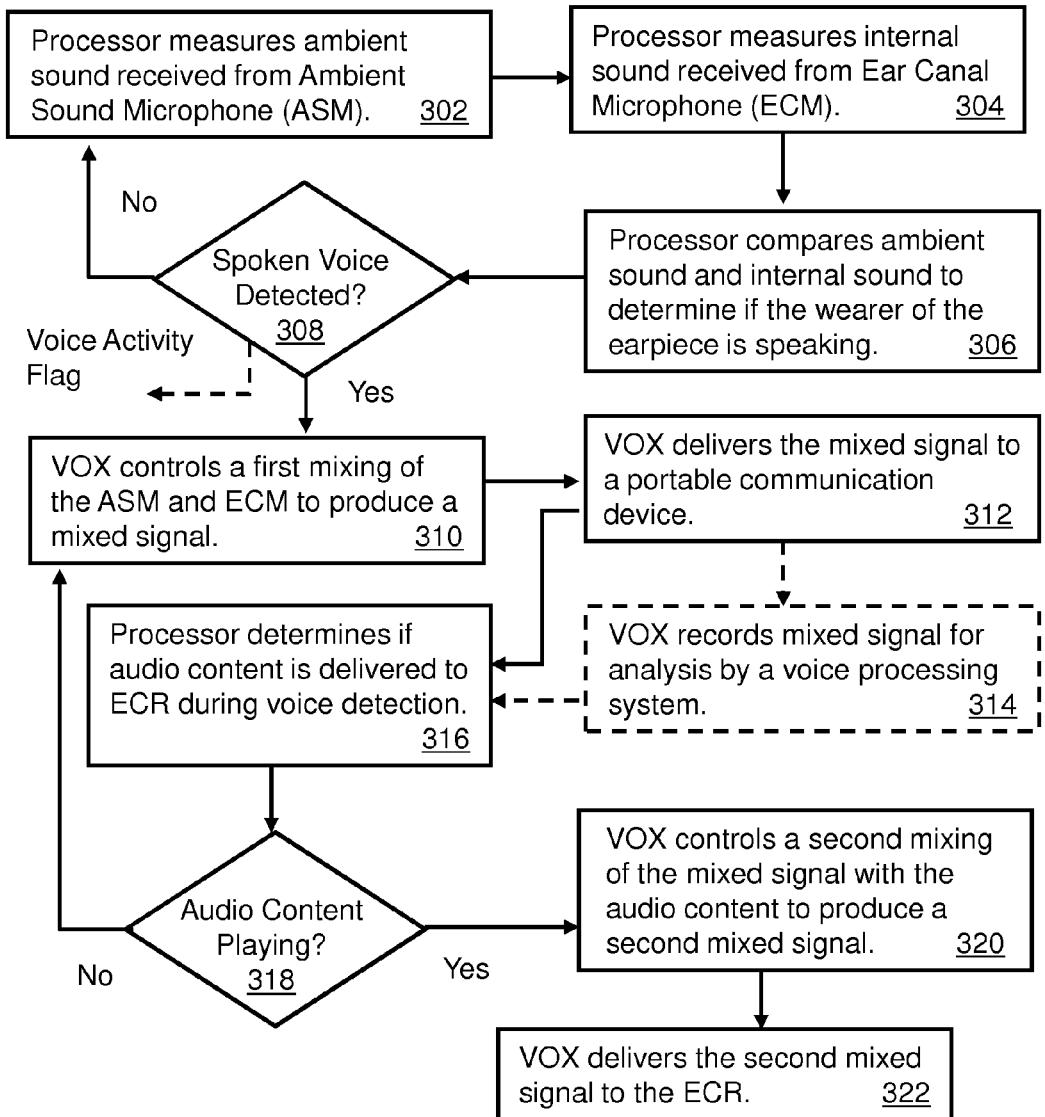
FIG. 3 is a flowchart of a method for voice operated control in accordance with an exemplary embodiment.

FIG. 3 is a flowchart of a method 300 for voice operated control in accordance with an exemplary embodiment. The method 300 can be practiced with more or less than the number of steps shown and is not limited to the order shown. To describe the method 300, reference will be made to FIG. 4 and components of FIG. 1 and FIG. 2, although it is understood that the method 300 can be implemented in any other manner using other suitable components. The method 300 can be implemented in a single earpiece, a pair of earpieces, headphones, or other suitable headset audio delivery device.

The method 300 can start in a state wherein the earpiece 100 has been inserted in an ear canal of a wearer. As shown in step 302, the earpiece 100 can measure ambient sounds in the environment received at the ASM 111. Ambient sounds correspond to sounds within the environment such as the sound of traffic noise, street noise, conversation babble, or any other acoustic sound. Ambient sounds can also correspond to industrial sounds present in an industrial setting, such as, factory noise, lifting vehicles, automobiles, and robots to name a few.

During the measuring of ambient sounds in the environment, the earpiece 100 also measures internal sounds, such as ear canal levels, via the ECM 123 as shown in step 304. The internal sounds can include ambient sounds passing through the earpiece 100 as well as spoken voice generated by a wearer of the earpiece 100. Although the earpiece 100 when inserted in the ear can partially of fully occlude the ear canal, the earpiece 100 may not completely attenuate the ambient sound. The passive aspect of the earpiece 100, due to the mechanical and sealing properties, can provide upwards of a 22 dB noise reduction. Portions of ambient sounds higher than the noise reduction level may still pass through the earpiece 100 into the ear canal thereby producing residual sounds. For instance, high energy low frequency sounds may not be completely attenuated. Accordingly, residual sound may be resident in the ear canal producing internal sounds that can be measured by the ECM 123. Internal sounds can also correspond to audio content and spoken voice when the user is speaking and/or audio content is delivered by the ECR 125 to the ear canal 131 by way of the audio interface 212.

At step 306, the processor 121 compares the ambient sound and the internal sound to determine if the wearer (i.e., the user wearing the earpiece 100) of the earpiece 100 is speaking. That is, the processor 121 determines if the sound received at the ASM 111 and ECM 123 corresponds to the wearer's voice or to other voices in the wearer's environment. Notably, the enclosed air chamber (~5 cc volume) within the user's ear canal due to the occlusion of the earpiece 100 causes a build up of sound waves when the wearer speaks. Accordingly, the ECM 123 picks up the wearer's voice in the ear canal when the wearer is speaking even though the ear canal is occluded. The processor 121, by way of one or more decisional approaches, such as correlation analysis, level-detection, coherence, and spectral analysis, determines whether the sound captured at the ASM 111 and ECM 123 corresponds to the wearer's voice or ambient sounds in the environment, such as other users talking in a conversation. The processor 121 can also identify a voicing level from the ambient sound and the internal sound. The voicing level identifies a degree of intensity and periodicity of the sound. For instance, a vowel is highly voiced due to the periodic vibrations of the vocal cords and the intensity of the air rushing through the vocal cords from the lungs. In contrast, unvoiced sounds such as fricatives and plosives have a low voicing level since they are produced by rushing non-periodic air waves and are relatively short in duration.

Figure 4:
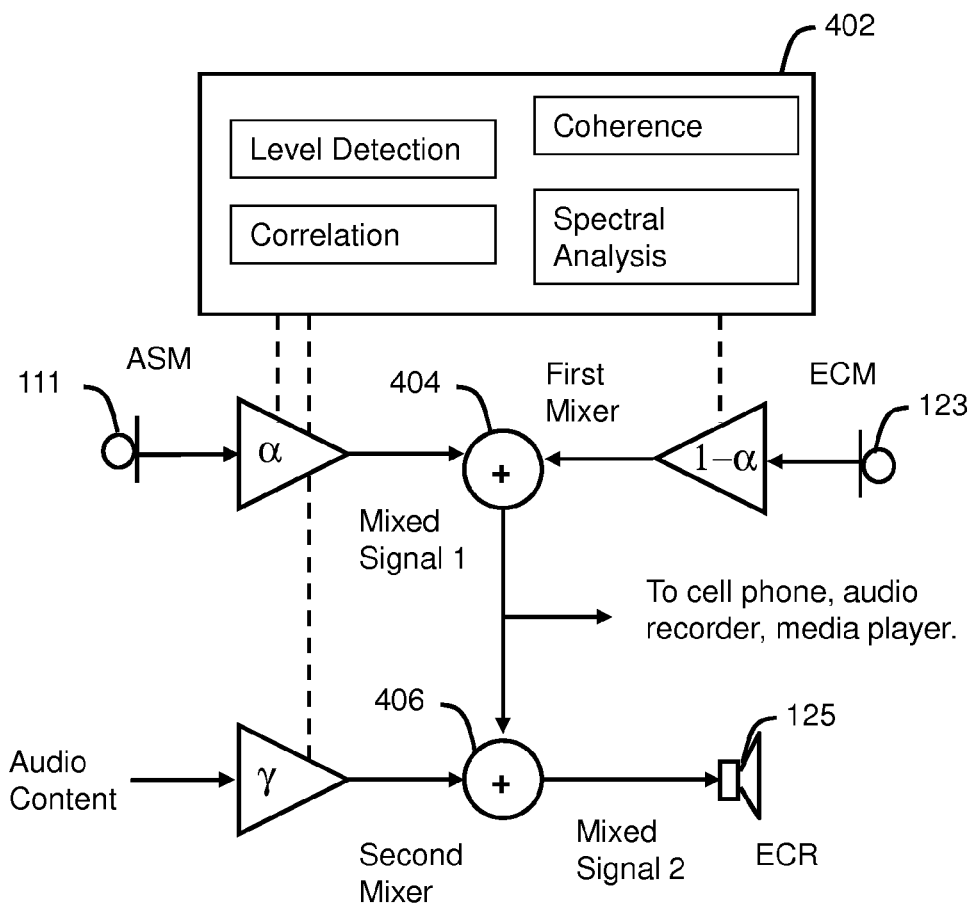
FIG. 4 is a block diagram for mixing sounds responsive to voice operated control in accordance with an exemplary embodiment.

If at step 308, spoken voice from the wearer of the earpiece 100 is detected, the earpiece 100 can proceed to control a mixing of the ambient sound received at the ASM 111 with the internal sound received at the ECM 123, as shown in step 310, and in accordance with the block diagram 400 of FIG. 4. If spoken voice from the wearer is not detected, the method 300 can proceed back to step 302 and step 304 to monitor ambient and internal sounds. The VOX 202 can also generate a voice activity flag declaring the presence of spoken voice by the wearer of the earpiece 100, which can be passed to other subsystems.

As shown in FIG. 4, the first mixing 402 can include adjusting the gain of the ambient sound and internal sound, and with respect to background noise levels. For instance, the VOX 202 upon deciding that the sound captured at the ASM 111 and ECM 123 originates from the wearer of the earpiece 100 can combine the ambient sound and the internal sound with different gains to produce a mixed signal. The mixed signal can apply weightings more towards the ambient sound or internal sound depending on the background noise level, wearer's vocalization level, or spectral characteristics. The mixed signal can thus include sound waves from the wearer's voice captured at the ASM 111 and also sound waves captured internally in the wearer's ear canal generated via bone conduction.

Briefly referring to FIG. 4, a block diagram 400 for voice operated control is shown. The VOX 202 can include algorithmic modules 402 for correlation, level detection, coherence, and spectral analysis. The VOX 202 applies one or more of these decisional approaches, as will be further described ahead, for determining if the ambient sound and internal sound correspond to the wearer's spoken voice. In the decisional process, the VOX 202 can prior to the first mixing 404 assign mixing gains ($\alpha$) and ($1-\alpha$) to the ambient sound signal from the ASM 111 and the internal sound signal from the ECM 123. These mixing gains establish how the ambient sound signals and internal sound signals are combined for further processing.

In one arrangement based on correlation, the processor 121 determines if the internal sound captured at the ECM 123 arrives before the ambient sound at the ASM 111. Since the wearer's voice is generated via bone conduction in the ear canal, it travels a shorter distance than acoustic wave emanating from the wearer's mouth to the ASM 111 at the wearer's ear. The VOX 202 can analyze the timing of one or more peaks in a cross correlation between the ambient sound and the internal sound to determine whether the sound originates from the ear canal, thus indicating that the wearer's spoken voice generated the sound. Whereas, sounds generated external to the ear canal, such as those of neighboring talkers, reach the ASM 111 before passing through the earpiece 100 into the wearer's ear canal. A spectral comparison of the ambient sound and internal sound can also be performed to determine the origination point of the captured sound.

In another arrangement based on level detection, the processor 121 determines if either the ambient sound or internal sound exceeds a predetermined threshold, and if so, compares a Sound Pressure Level (SPL) between the ambient sound and internal sound to determine if the sound originates from the wearer's voice. In general, the SPL at the ECM 123 is higher than the SPL at the ASM 111 if the wearer of the earpiece 100 is speaking. Accordingly, a first metric in determining whether the sound captured at the ASM 111 and ECM 123 is to compare the SPL levels at both microphones.

In another arrangement based on spectral distribution, a spectrum analysis can be performed on audio frames to assess the voicing level. The spectrum analysis can reveal peaks and valleys of vowels characteristic of voiced sounds. Most vowels are represented by three to four formants which contain a significant portion of the audio energy. Formants are due to the shaping of the air passage way (e.g., throat, tongue, and mouth) as the user 'forms' speech sounds. The voicing level can be assigned based on the degree of formant peaking and bandwidth.

The threshold metric can be first employed so as to minimize the amount of processing required to continually monitor sounds in the wearer's environment before performing the comparison. The threshold establishes the level at which a comparison between the ambient sound and internal sound is performed. The threshold can also be established via learning principles, for example, wherein the earpiece 100 learns when the wearer is speaking and his or her speaking level in various noisy environments. For instance, the processor 121 can record background noise estimates from the ASM 111 while simultaneously monitoring the wearer's speaking level at the ECM 123 to establish the wearer's degree of vocalization relative to the background noise.

Returning back to FIG. 3, at step 310, the VOX 202 can deliver the mixed signal to a portable communication device, such as a cell phone, personal digital assistant, voice recorder, laptop, or any other networked or non-networked system component (see also FIG. 4). Recall the VOX 202 can generate the mixed signal in view of environmental conditions, such as the level of background noise. So, in high background noises, the mixed signal can include more of the internal sound from the wearer's voice generated in ear canal and captured at the ECM 123 than the ambient sound with the high background noises. In a quiet environment, the mixed signal can include more of the ambient sound captured at the ASM 111 than the wearer's voice generated in ear canal. The VOX 202 can also apply various spectral equalizations to account for the differences in spectral timbre from the ambient sound and the internal sound based on the voice activity level and/or mixing scheme.

As shown in optional step 314, the VOX 202 can also record the mixed signal for further analysis by a voice processing system. For instance, the earpiece 100 having identified voice activity levels previously at step 308 can pass command to another module such as a voice recognition system, a voice dictation system, a voice recorder, or any other voice processing module. The recording of the mixed signal at step 314 allows the processor 121, or voice processing system receiving the mixed signal to analyze the mixed signal for information, such as voice commands or background noises. The voice processing system can thus examine a history of the mixed signal from the recorded information.

The earpiece 100 can also determine whether the sound corresponds to a spoken voice of the wearer even when the wearer is listening to music, engaged in a phone call, or receiving audio via other means. Moreover, the earpiece 100 can adjust the internal sound generated within the ear canal to account for the audio content being played to the wearer while the wearer is speaking. As shown in step 316, the VOX 202 can determine if audio content is being delivered to the ECR 125 in making the determination of spoken voice. Recall, audio content such as music is delivered to the ear canal via the ECR 125 and plays the audio content to the wearer of the earpiece 100. If at step 318, the earpiece 100 is delivering audio content to the user, the VOX 202 at step 320 can control a second mixing of the mixed signal with the audio content to produce a second mixed signal (see second mixer 406 of FIG. 4). This second mixing provides loopback from the ASM 111 and the ECM 123 of the wearer's own voice to allow the wearer to hear themselves when speaking in the presence of audio content delivered to the ear canal via the ECR 125. If audio content is not playing, the method 300 can proceed back to step 310 to control the mixing of the wearer's voice (i.e., speaker voice) between the ASM 111 and the ECM 123.

Upon mixing the mixed signal with the audio content, the VOX 202 can deliver the second mixed signal to the ECR 125 as indicated in step 322 (see also FIG. 4). In such regard, the VOX 202 permits the wearer to monitor his or her own voice and simultaneously hear the audio content. The method can end after step 322. Notably, the second mixing can also include soft muting the audio content during the duration of voice activity detection, and resuming audio content playing during non-voice activity or after a predetermined amount of time. The VOX 202 can further amplify or attenuate the spoken voice based on the level of the audio content if the wearer is speaking at a higher level and trying to overcome the audio content they hear. For instance, the VOX 202 can compare and adjust a level of the spoken voice with respect to a previously calculated (e.g., via learning) level.

Figure 5:
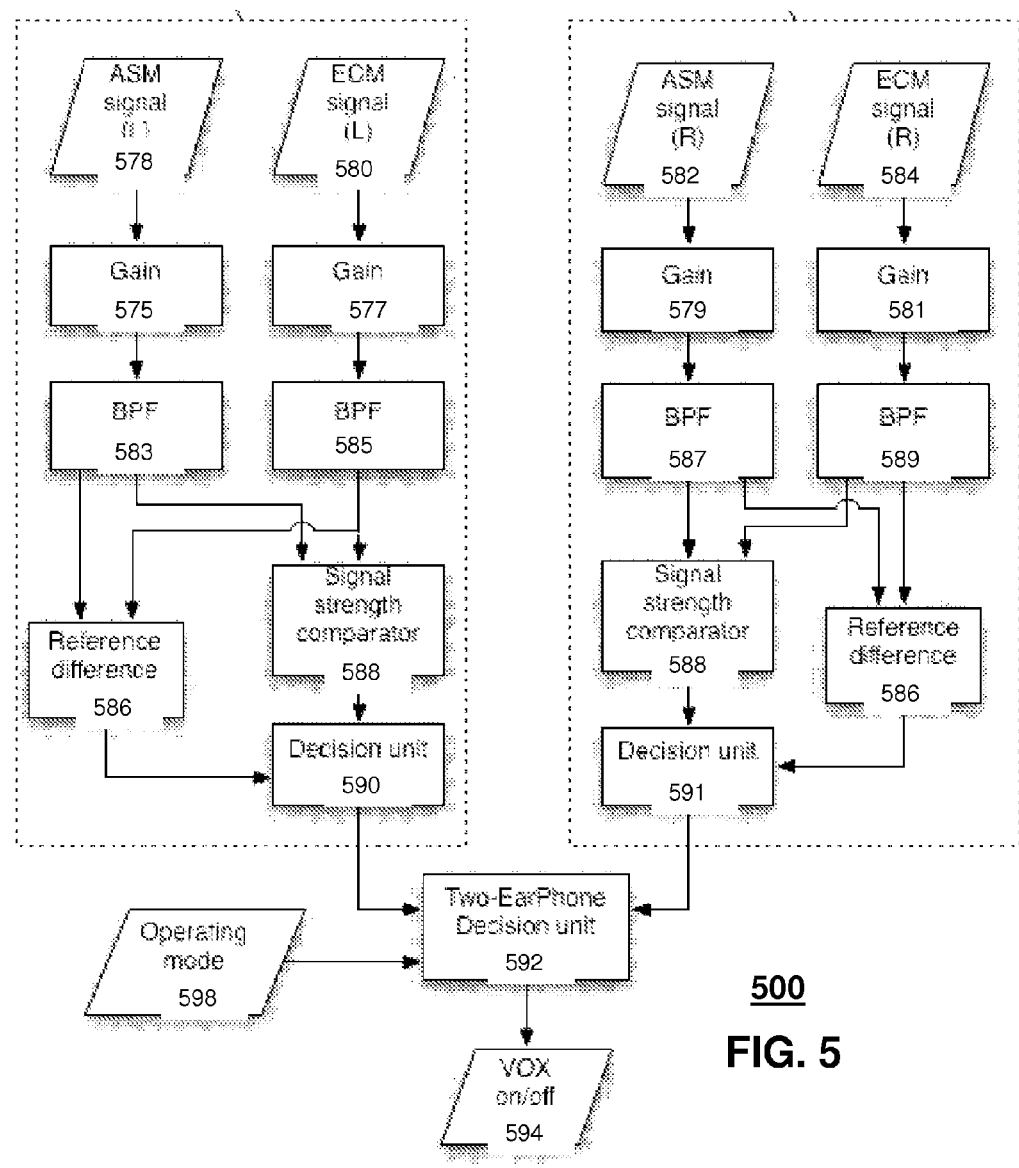
FIG. 5 is a flowchart for a voice activated switch based on level differences in accordance with an exemplary embodiment.

FIG. 5 is a flowchart 500 for a voice activated switch based on level differences in accordance with an exemplary embodiment. The flowchart 500 can include more or less than the number of steps shown and is not limited to the order of the steps. The flowchart 500 can be implemented in a single earpiece, a pair of earpieces, headphones, or other suitable headset audio delivery device.

FIG. 5 illustrates an arrangement wherein the VOX 202 uses as it's inputs the ambient sound microphone (ASM) signals from the left 578 and right 582 earphone devices, and the Ear Canal Microphone (ECM) signals from the left 580 and right 584 signals. The ASM and ECM signals are amplified with amplifier 575, 577, 579, 581 before filtered using Band Pass Filter 583, 585, 587, 589, which can have the same frequency response. The filtering can use analog or digital electronics, as may the subsequent signal strength comparison 588 of the filtered and amplified ASM and ECM signals from the left and right earphone devices. The VOX 202 determines that when the filtered ECM signal level exceeds the filtered ASM signal level by an amount determined by the reference difference unit 586, decision units 590, 591 deem that user-generated voice is present. The VOX 202 introduces a further decision unit 592 that takes as it's input the outputs of decision unit from both the left 590 and right 591 earphone device, which can be combined into a single functional unit. As an example, the decision unit 592 can be either an AND or OR logic gate, depending on the operating mode selected with (optional) user-input 98. The output decision 594 operates the VOX 202 in a voice communication system, for example, allowing the user's voice to be transmitted to a individual (e.g. using radio frequency communications) or for the user's voice to be recorded.

Figure 6:
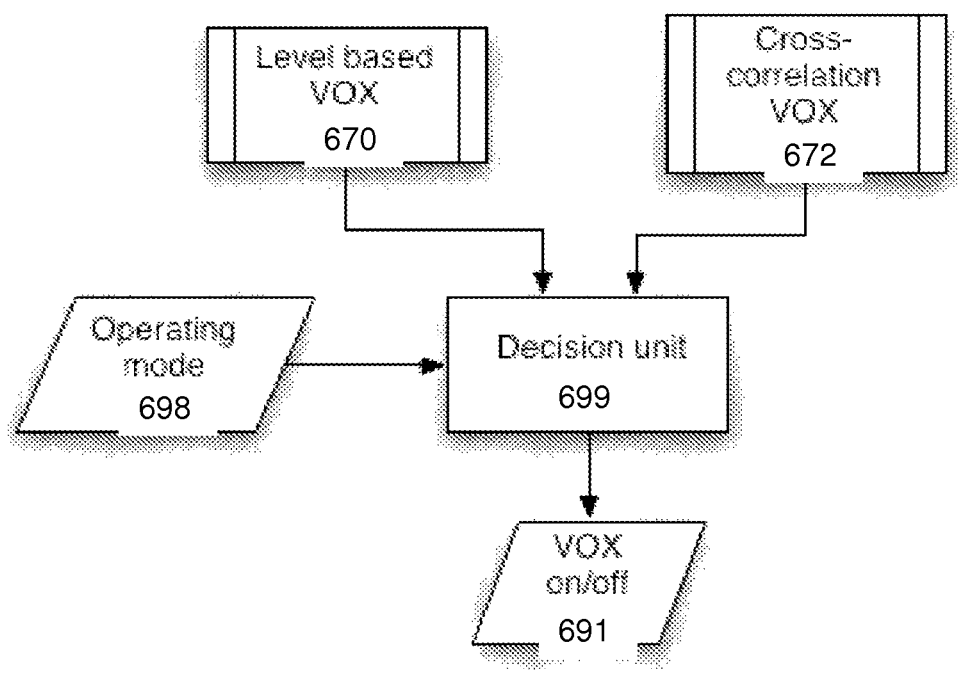
FIG. 6 is a block diagram of a voice activated switch using inputs from level and cross correlation in accordance with an exemplary embodiment.

FIG. 6 is a block diagram 600 of a voice activated switch using inputs from level and cross correlation in accordance with an exemplary embodiment. The block diagram 600 can include more or less than the number of steps shown and is not limited to the order of the steps. The block diagram 600 can be implemented in a single earpiece, a pair of earpieces, headphones, or other suitable headset audio delivery device As illustrated, the voice activated switch 600 uses both the level-based detection method 670 described in FIG. 5 and also a correlation-based method 672 described ahead in FIG. 7. The decision unit 699 can be either an AND or OR logic gate, depending on the operating mode selected with (optional) user-input 698. The decision unit 699 can generate a voice activated on or off decision 691.

Figure 7:
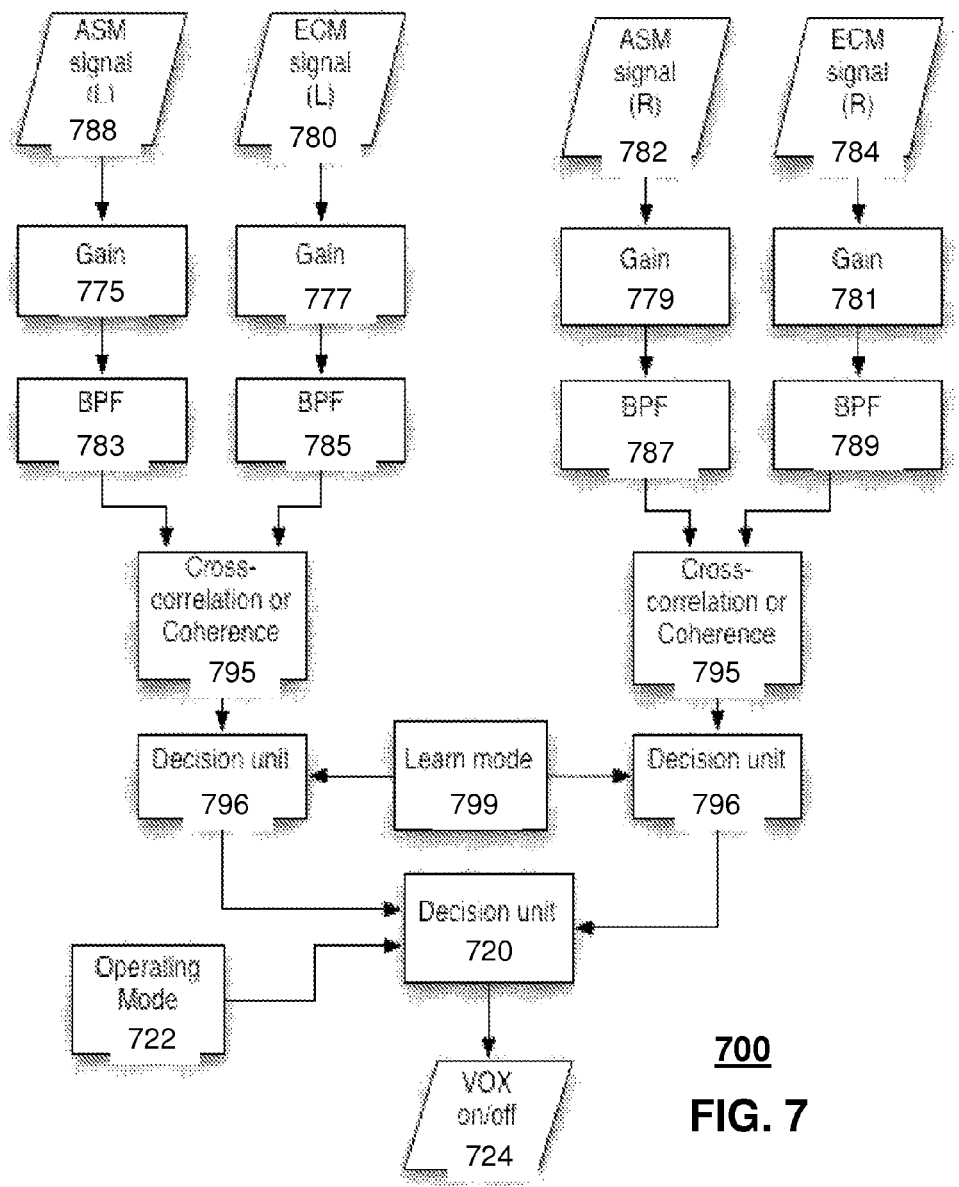
FIG. 7 is a flowchart for a voice activated switch based on cross correlation in accordance with an exemplary embodiment.

FIG. 7 is a flowchart 700 for a voice activated switch based on cross correlation in accordance with an exemplary embodiment. The flowchart 700 can include more or less than the number of steps shown and is not limited to the order of the steps. The flowchart 700 can be implemented in a single earpiece, a pair of earpieces, headphones, or other suitable headset audio delivery device.

As illustrated, there are two parallel paths for the left and right earphone device. For each earphone device, the inputs are the filtered ASM and ECM signals. In the first path, the left ASM signal 788 is passed to a gain function 775 and band-pass filtered 783. The left ECM signal 780 is also passed to a gain function 777 and band-pass filtered 785. In the second path, the right ASM signal 782 is passed to a gain function 779 and band-pass filtered 787. The right ECM signal 784 is also passed to a gain function 781 and band-pass filtered 789. The filtering can be performed in the time domain or digitally using frequency or time domain filtering. A cross correlation or coherence between the gain scaled and band-pass filtered signals is then calculated at unit 795.

Upon calculating the cross correlation, decision unit 796 undertakes analysis of the cross-correlation vector to determine a peak and the lag at which this peak occurs for each path. An optional "learn mode" unit 799 is used to train the decision unit 799 to be robust to detect the user voice, and lessen the chance of false positives (i.e. predicting user voice when there is none) and false negatives (i.e. predicting no user voice when there is user voice). In this learn mode, the user is prompted to speak (e.g. using a user-activated voice or non-voice audio command and/or visual command using a display interface on a remote control unit), and the VOX 202 records the calculated cross-correlation and extract the peak value and lag at which this peak occurs. The lag and (optionally) peak value for this reference measurement in "learn mode" is then recorded to computer memory and is used to compare other cross-correlation measurements. If the lag-time for the peak a cross-correlation measurement matches the reference lag value, or another pre-determined value, then the decision unit 796 outputs a "user voice active" message (e.g. represented by a logical 1, or soft decision between 0 and 1) to the second decision unit 720. In some embodiments, the decision unit 720 can be an OR gate or AND gate; as determined by the particular operating mode 722 (which may be user defined or pre-defined).

Figure 8:
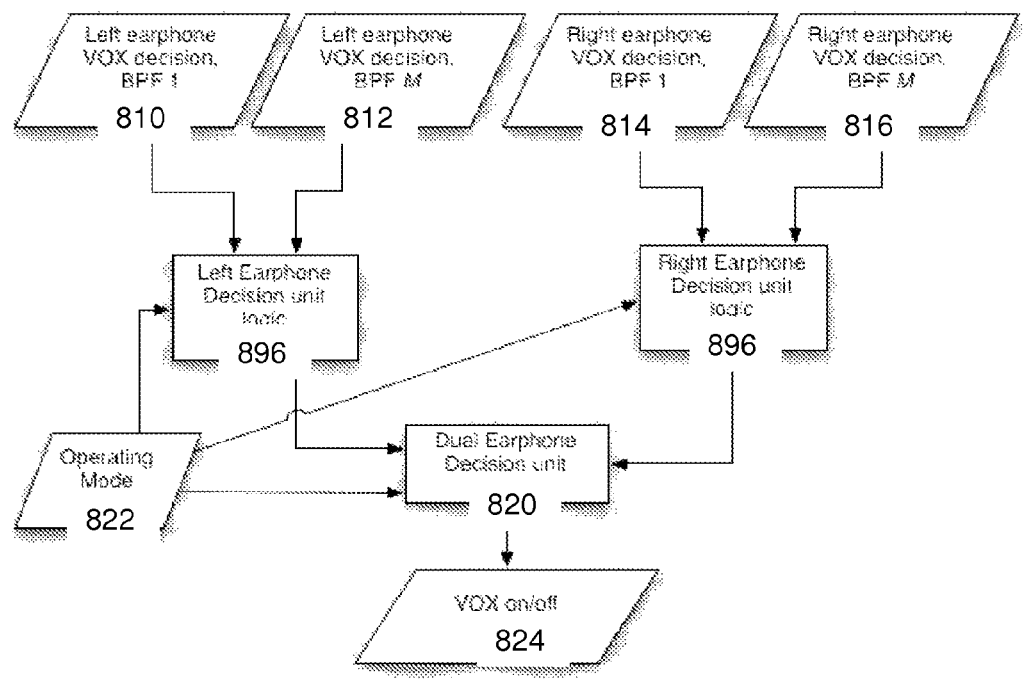
FIG. 8 is a flowchart for a voice activated switch based on cross correlation using a fixed delay method in accordance with an exemplary embodiment.

FIG. 8 is a flowchart 800 for a voice activated switch based on cross correlation using a fixed delay method in accordance with an exemplary embodiment. The flowchart 800 can include more or less than the number of steps shown and is not limited to the order of the steps. The flowchart 800 can be implemented in a single earpiece, a pair of earpieces, headphones, or other suitable headset audio delivery device Flowchart 800 provides an overview of a multi-band analysis of cross-correlation platform. In one arrangement, the cross-correlation can use a fixed-delay cross-correlation method described in the provisional filing of this current application. The logic output of the different band-pass filters (810-816) are fed into decision unit 896 for both the left (810/812) and right (814/816) earphone device. The decision unit 896 can be a simple logical AND unit, or an OR unit (this is because depending on the particular vocalization of the user, e.g. a sibilant fricative or a voiced vowel, the lag of the peak in the cross-correlation analysis may be different for different frequencies). The particular configuration of the decision unit 896 can be configured by the operating mode 822, which may be user-defined or pre-defined. The dual decision unit 820 in the preferred embodiment is a logical AND gate, though may be an OR gate, and returns a binary decision to the VOX 824.

Figure 9:
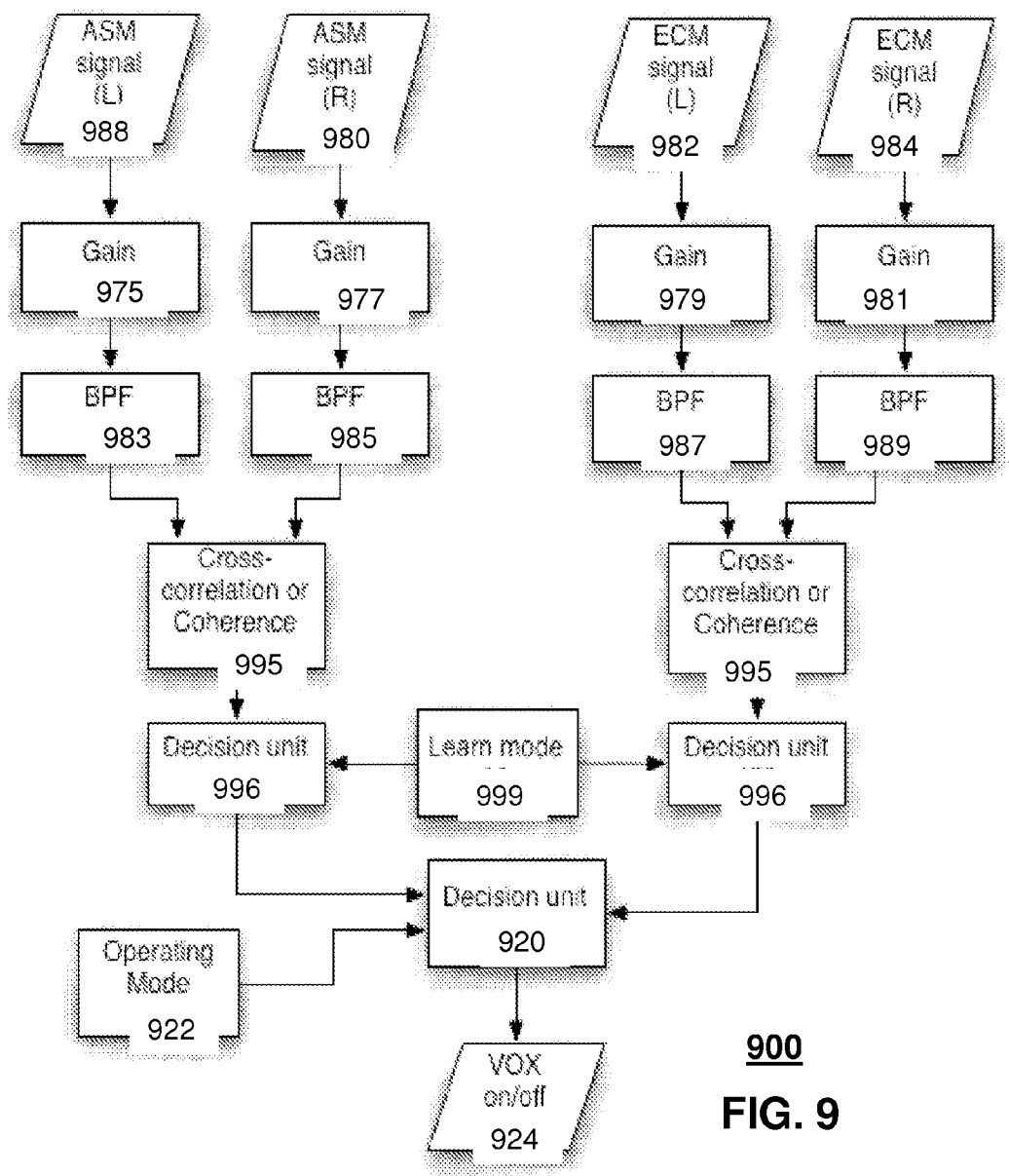
FIG. 9 is a flowchart for a voice activated switch based on cross correlation and coherence analysis using inputs from different earpieces in accordance with an exemplary embodiment.

FIG. 9 is a flowchart 900 for a voice activated switch based on cross correlation and coherence analysis using inputs from different earpieces in accordance with an exemplary embodiment. The flowchart 900 can include more or less than the number of steps shown and is not limited to the order of the steps. The flowchart 900 can be implemented in a single earpiece, a pair of earpieces, headphones, or other suitable headset audio delivery device Flowchart 900 is a variation of flowchart 700 where instead of comparing the ASM and ECM signals of the same earphone device, the ASM signals of different earphone devices are compared, and alternatively or additionally, the ECM signals of different earphone devices are also compared. As illustrated, there are two parallel paths for the left and right earphone device. For each earphone device, the inputs are the filtered ASM and ECM signals. In the first path, the left ASM signal 988 is passed to a gain function 975 and band-pass filtered 983. The right ASM signal 980 is also passed to a gain function 977 and band-pass filtered 985. The filtering can be performed in the time domain or digitally using frequency or time domain filtering. In the second path, the left ECM signal 982 is passed to a gain function 979 and band-pass filtered 987. The right ECM signal 984 is also passed to a gain function 981 and band-pass filtered 989.

A cross correlation or coherence between the gain scaled and band-pass filtered signals is then calculated at unit 995 for each path. Upon calculating the cross correlation, decision unit 996 undertakes analysis of the cross-correlation vector to determine a peak and the lag at which this peak occurs. The decision unit 996 searches for a high coherence or a correlation with a maxima at lag zero to indicate that the origin of the sound source is equidistant to the input sound sensors. If the lag-time for the peak a cross-correlation measurement matches a reference lag value, or another pre-determined value, then the decision unit 996 outputs a "user voice active" message at 924 (e.g. represented by a logical 1, or soft decision between 0 and 1) to the second decision unit 920. In some embodiments, the decision unit 920 can be an OR gate or AND gate; as determined by the particular operating mode 922 (which may be user defined or pre-defined).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions of the relevant exemplary embodiments. Thus, the description of the invention is merely exemplary in nature and, thus, variations that do not depart from the gist of the invention are intended to be within the scope of the exemplary embodiments of the present invention. Such variations are not to be regarded as a departure from the spirit and scope of the present invention.

What is claimed is:

1. An acoustic device, comprising:
    an ear canal microphone configured to detect a first acoustic signal;
    an ambient microphone configured to detect a second acoustic signal; and
    a processor operatively coupled to the ear canal microphone and the ambient microphone, where the processor is configured to:
        detect a predetermined speech pattern based on an analysis of the first acoustic signal and the second acoustic signal; and
        upon detection of the predetermined speech pattern, subsequently processing acoustic signals from the ear canal microphone for a predetermined time and for a second predetermined time when the ear canal microphone detects a lack of an acoustic signal; and
        after the predetermined time or after the second predetermined time, processing acoustic signals from the ear canal microphone and the ambient microphone.

2. The acoustic device of claim 1, wherein the predetermined speech pattern is a voice command.

3. The acoustic device of claim 1, wherein the lack of the acoustic signal for the second predetermined time is a duration of non-voice activity.

4. The acoustic device of claim 1, wherein the processor further passes voice commands to a voice recognition module at a cell phone or remotely via a network.

5. The acoustic device of claim 1, wherein the processor passes voice commands or background noises via a network to a voice processing module that analyzes voice commands.

6. The acoustic device of claim 1, wherein the acoustic device further comprises a voice operated control module that operates as a switch when detecting the presence of spoken voice.

7. The acoustic device of claim 1, wherein the acoustic device further comprises a voice operated control module that generates a voice activity flag upon detection of spoken voice.

8. The acoustic device of claim 7, wherein the voice activity flag is passed to a voice recognition module.

9. The acoustic device of claim 1, further comprising a voice operated control module that causes the adjustment of a gain of the second acoustic signal from the ambient microphone upon a detection of the presence of spoken voice.

10. The acoustic device of claim 1, further comprising a voice operated control module that causes the adjustment of a gain of the first acoustic signal from the ear canal microphone and a gain of the second acoustic signal from the ambient microphone by applying different weightings to the gain of the first acoustic signal and the second acoustic signal.

11. The acoustic device of claim 1, wherein applying a zero weighting to the second acoustic signal causes a full weighting to the first acoustic signal causing a switch to the ear canal microphone.

12. An acoustic device, comprising:
    a first microphone configured to detect a first acoustic signal;
    a second microphone configured to detect a second acoustic signal; and
    a processor operatively coupled to the first microphone and the second microphone, where the processor is configured to:
        detect a predetermined speech pattern based on an analysis of the first acoustic signal and the second acoustic signal; and
        upon detection of the predetermined speech pattern, subsequently processing acoustic signals from the first microphone for a predetermined time and for a second predetermined time if the first microphone detects a lack of an acoustic signal; and
        after the predetermined time or after the second predetermined time, processing acoustic signals from the first microphone and the second microphone.

13. The acoustic device of claim 12, wherein the first microphone is an ear canal microphone and the second microphone is an ambient microphone.

14. The acoustic device of claim 12, wherein the first microphone is an ambient microphone and the second microphone is an ear canal microphone.

15. The acoustic device of claim 12, wherein the first microphone is used upon detection of the predetermined speech pattern after further determining that the first acoustic signal has a higher quality than the second acoustic signal.

16. The acoustic device of claim 12, wherein the processor passes voice commands via a network to a voice processing module that analyzes voice commands.

\* \* \* \* \*